United States Patent
Sohn (10) Patent No.: US 10,160,280 B2
(45) Date of Patent: Dec. 25, 2018

(54) VEHICLE YAW MOTION CONTROL METHOD AND APPARATUS USING SUSPENSION

(71) Applicant: HYUNDAI MOTOR COMPANY, Seoul (KR)

(72) Inventor: Ki Mo Sohn, Cheongju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 297 days.

(21) Appl. No.: 15/085,817

(22) Filed: Mar. 30, 2016

(65) Prior Publication Data
US 2017/0197485 A1    Jul. 13, 2017

(30) Foreign Application Priority Data
Jan. 13, 2016  (KR) .......................... 10-2016-0004157

(51) Int. Cl.
| | | |
|---|---|---|
| B60G 17/016 | (2006.01) | |
| B60G 17/018 | (2006.01) | |
| B60G 17/06 | (2006.01) | |

(52) U.S. Cl.
CPC ..... B60G 17/0162 (2013.01); B60G 17/0182 (2013.01); B60G 17/06 (2013.01);
(Continued)

(58) Field of Classification Search
CPC  B60G 17/0162; B60G 17/0182; B60G 17/06; B60G 2400/0511; B60G 2400/0521; B60G 2500/11; B60G 2500/40
See application file for complete search history.

(56) References Cited

U.S. PATENT DOCUMENTS

| | | | | |
|---|---|---|---|---|
| 8,116,938 | B2 * | 2/2012 | Itagaki | ............... B60G 17/0182 |
| | | | | 280/5.515 |
| 2006/0041367 | A1 * | 2/2006 | Ono | ..................... B60G 17/016 |
| | | | | 701/75 |

(Continued)

FOREIGN PATENT DOCUMENTS

| | | | |
|---|---|---|---|
| EP | 3109143 | A4 * | 11/2017 |
| JP | 06-211018 | A | 8/1994 |

(Continued)

OTHER PUBLICATIONS

Office Action Korean Patent Application No. 10-2016-0004157 dated Feb. 23, 2017.

*Primary Examiner* — Jelani A Smith
*Assistant Examiner* — Donald J Wallace
(74) *Attorney, Agent, or Firm* — McDermott Will & Emery LLP (57) ABSTRACT

A control method includes calculating a roll angle and a roll angular velocity of a vehicle, setting damping forces applied to front and rear wheel dampers to execute first and second modes according to signs of the roll angle and roll angular velocity, and controlling the front and rear wheel dampers in consideration of the damping forces. Upon determination that the signs of the roll angle and the roll angular velocity are different, in the first mode, damping force greater than front wheel reference force and damping force smaller than rear wheel reference force are set to be applied to the front wheel dampers and the rear wheel dampers, respectively, and in the second mode, damping force smaller than the front wheel reference force and damping force greater than the rear wheel reference force are set to be applied to the front wheel dampers and the rear wheel dampers, respectively.

11 Claims, 3 Drawing Sheets

(52) U.S. Cl.
CPC .............. *B60G 2400/0511* (2013.01); *B60G 2400/0521* (2013.01); *B60G 2500/11* (2013.01); *B60G 2500/40* (2013.01)

(56) References Cited

U.S. PATENT DOCUMENTS

| | | | | |
|---|---|---|---|---|
| 2007/0067080 A1* | 3/2007 | Messih | ............... | B60R 21/0132 701/37 |
| 2009/0234537 A1* | 9/2009 | Tomida | .............. | B60G 17/0162 701/38 |
| 2017/0080769 A1* | 3/2017 | Kurita | .................... | B62K 25/04 |

FOREIGN PATENT DOCUMENTS

| | | | |
|---|---|---|---|
| JP | 09-109641 | A | 4/1997 |
| JP | 09109641 | A * | 4/1997 |
| JP | 2003-504615 | A | 2/2003 |
| JP | 2008-100579 | A | 5/2008 |
| JP | 2012-046037 | A | 3/2012 |
| JP | 2014-019335 | A | 2/2014 |
| JP | 2015-014519 | A | 1/2015 |
| KR | 10-2011-0021824 | A | 3/2011 |
| KR | 10-1500070 | B1 | 3/2015 |
| KR | 10-2015-0102189 | A | 9/2015 |

\* cited by examiner

| CORRESPONDING SECTION | SECTION DISTINCTION | GENERAL CONTROL | | CONTROL ACCORDING TO EMBODIMENT | |
|---|---|---|---|---|---|
| | | AGILITY MODE | STABILITY MODE | AGILITY MODE | STABILITY MODE |
| 10 | (ROLL ANGLE>0) and (ROLL ANGULAR VELOCITY>0) | FRONT WHEELS Soft-REAR WHEELS Hard | FRONT WHEELS Hard-REAR WHEELS Soft | FRONT WHEELS Soft-REAR WHEELS Hard | FRONT WHEELS Hard-REAR WHEELS Soft |
| 20 | (ROLL ANGLE>0) and (ROLL ANGULAR VELOCITY<0) | | | FRONT WHEELS Hard-REAR WHEELS Soft | FRONT WHEELS Soft-REAR WHEELS Hard |
| 30 | (ROLL ANGLE<0) and (ROLL ANGULAR VELOCITY<0) | | | FRONT WHEELS Soft-REAR WHEELS Hard | FRONT WHEELS Hard-REAR WHEELS Soft |
| 40 | (ROLL ANGLE<0) and (ROLL ANGULAR VELOCITY>0) | | | FRONT WHEELS Hard-REAR WHEELS Soft | FRONT WHEELS Soft-REAR WHEELS Hard |

VEHICLE YAW MOTION CONTROL METHOD AND APPARATUS USING SUSPENSION

This application claims the benefit of priority to Korean Patent Application No. 10-2016-0004157, filed on Jan. 13, 2016, which is hereby incorporated by reference as if fully set forth herein.

TECHNICAL FIELD

The present disclosure relates to a suspension for vehicles, and more particularly, to a vehicle yaw motion control method and apparatus using a suspension for improving driving performance.

BACKGROUND

A suspension is a device which influences ride comfort of passengers and steering of a vehicle. The suspension performs a function of absorbing impact generated from a road surface so as not to be directly transmitted to a vehicle frame or passengers and performs a function of causing a tire to sufficiently contact the road surface during sudden braking or sudden turning of the vehicle.

The suspension includes a spring which absorbs impact in a first one stroke and a damper which copes with impact after the first stroke. The damper controls the width (stroke) of expansion of the spring.

The main purpose of such a damper is to control ride comfort and to improve ground contact force through control of vehicle behavior in the vertical direction. However, since vehicle behavior in the vertical direction is greatly related to vehicle behavior in the lateral direction based on vehicle and tire dynamic characteristics, vehicle behavior in the lateral direction may be controlled using the damper.

In a situation in which a vehicle suddenly avoids an obstacle, steering (handling) of the vehicle and stability (balance) of a vehicle frame rather than ride comfort are important. In such an avoidance situation, relatively accurate control of vehicle behavior in the lateral direction is required and vehicle behavior in the lateral direction is deeply related to vehicle behavior in the vertical direction, and thus, driving performance of the vehicle in connection with behavior in the lateral direction may be further improved using a damper to control behavior in the vertical direction.

However, in case of conventional methods for controlling vehicle behavior using a damper, an influence degree of the damper on a yaw motion may not be estimated, or, since control of driving is performed only based on setting of the damper without considering that directionality of the influence on the yaw motion may be changed according to change of the roll motion, it is difficult to accurately control steering ability and stability of the vehicle and driving performance may be lowered according to driving situations.

SUMMARY

Accordingly, the present disclosure is directed to a vehicle yaw motion control method and apparatus using a suspension that substantially obviate one or more problems due to limitations and disadvantages of the related art.

An object of the present disclosure is to provide a vehicle yaw motion control method and apparatus using a suspension which may maximize driving performance of a vehicle by establishing a control strategy of damping forces applied to dampers according to state information based on control during control of a yaw motion using the dampers.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a vehicle control method includes calculating a roll angle and a roll angular velocity of a vehicle using state information of the vehicle, setting different damping forces applied to front wheel dampers and rear wheel dampers to execute a first mode and a second mode according to signs of the roll angle and the roll angular velocity, and controlling the front wheel dampers and the rear wheel dampers in consideration of the damping forces. Upon determination that the sign of the roll angle and the sign of the roll angular velocity are different, in the first mode, damping force greater than front wheel reference force is set to be applied to the front wheel dampers, and damping force smaller than rear wheel reference force is set to be applied to the rear wheel dampers, and in the second mode, damping force smaller than the front wheel reference force is set to be applied to the front wheel dampers and damping force greater than the rear wheel reference force is set to be applied to the rear wheel dampers.

Setting of the different damping forces applied to the front wheel dampers and the rear wheel dampers to execute the first mode and the second mode according to signs of the roll angle and the roll angular velocity may include controlling the applied damping forces so that an actual yaw rate acquired by the state information becomes equal to a predetermined target yaw rate.

In setting of the different damping forces applied to the front wheel dampers and the rear wheel dampers to execute the first mode and the second mode according to signs of the roll angle and the roll angular velocity, if the sign of the roll angle and the sign of the roll angular velocity are the same, in the first mode, damping force smaller than the front wheel reference force may be set to be applied to the front wheel dampers and damping force greater than the rear wheel reference force may be set to be applied to the rear wheel dampers, and in the second mode, damping force greater than the front wheel reference force may be set to be applied to the front wheel dampers and damping force smaller than the rear wheel reference force may be set to be applied to the rear wheel dampers.

Control of the applied damping forces so that the actual yaw rate acquired by the state information becomes equal to the predetermined target yaw rate may include calculating a target yaw moment to track the target yaw rate and calculating damping forces to generate the target yaw moment.

The state information may include at least one of a steering angle, wheel speeds, a lateral acceleration and damper speeds.

Control of the front wheel dampers and the rear wheel dampers in consideration of the damping forces may include controlling driving currents of the front wheel dampers and the rear wheel dampers.

In another aspect of the present disclosure, a vehicle control apparatus includes a communication unit configured to receive state information of a vehicle, and a controller configured to calculate a roll angle and a roll angular velocity of the vehicle using the state information and to set different damping forces applied to front wheel dampers and rear wheel dampers to execute a first mode and a second mode according to signs of the roll angle and the roll angular velocity. Upon determination that the sign of the roll angle and the sign of the roll angular velocity are different, in the first mode, the controller sets damping force greater than front wheel reference force to be applied to the front wheel dampers and sets damping force smaller than rear wheel reference force to be applied to the rear wheel dampers, and in the second mode, the controller sets damping force smaller than the front wheel reference force to be applied to the front wheel dampers and sets damping force greater than the rear wheel reference force is set to be applied to the rear wheel dampers. The controller controls the front wheel dampers and the rear wheel dampers in consideration of the damping forces.

The controller may control the applied damping forces so that an actual yaw rate acquired by the state information becomes equal to a predetermined target yaw rate.

Upon determination that the sign of the roll angle and the sign of the roll angular velocity are the same, in the first mode, the controller may set damping force smaller than the front wheel reference force to be applied to the front wheel dampers and set damping force greater than the rear wheel reference force to be applied to the rear wheel dampers, and in the second mode, the controller may set damping force greater than the front wheel reference force to be applied to the front wheel dampers and set damping force smaller than the rear wheel reference force to be applied to the rear wheel dampers.

The controller may calculate a target yaw moment to track the target yaw rate and calculate damping forces to generate the target yaw moment.

The state information may include at least one of a steering angle, wheel speeds, a lateral acceleration and damper speeds.

The controller may control driving currents of the front wheel dampers and the rear wheel dampers.

In yet another aspect of the present disclosure, there is provided a computer readable recording medium to record a program to execute the vehicle control method.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. The suffixes "module" and "unit" used in the description below are given or used together only in consideration of ease in preparation of the specification and do not have distinctive meanings or functions.

In the following description of the present disclosure, a detailed description of known functions and configurations incorporated herein will be omitted when it may make the subject matter of the present disclosure rather unclear.

The present disclosure relates to a method and apparatus for improving driving performance of a vehicle by controlling a damper of a suspension.

Such a damper may control hard characteristics to soft characteristics according to characteristics of damping force. Here, hard characteristics mean that damping force applied to a spring expanding and contracting in response to the same external force is relatively great, as compared to damping force of soft characteristics expanding and contracting in response to the same external force.

In general, in a situation in which agility of a vehicle is required through analysis of curve braking characteristics of the vehicle, a front wheel damper is controlled so as to be soft and a rear wheel damper is controlled so as to be hard and thus, when the vehicle slides, the vehicle does not exceed a normal turning radius.

On the other hand, in a situation in which stability of the vehicle is required, the front wheel damper is controlled so as to be hard and the rear wheel damper is controlled so as to be soft so that excessive yaw moment generated by front wheels is reduced. That is, conventionally, vehicle behavior is controlled only according to damping force characteristics of dampers.

However, in consideration of a yaw moment variation calculated by Equation 1 below, conventional damper settings have an improper driving section according to the driving state of a vehicle.

Equation 1 is a mathematical equation in which an estimated yaw moment value according to the driving state of the vehicle is modeled.

$$\Delta M_z = l_f b t_f \left[ (F_{z,FL} - F_{z,FR})(\Delta b_{\phi,Fr}\dot{\phi}) - \frac{t_f}{2}(\Delta b_{\phi,Fr}\dot{\phi})^2 \right] \alpha_{Fr} - \quad \text{[Equation 1]}$$

$$l_r b t_r \left[ (F_{z,RL} - F_{z,RR})(\Delta b_{\phi,Rr}\dot{\phi}) - \frac{t_r}{2}(\Delta b_{\phi,Rr}\dot{\phi})^2 \right] \alpha_{Rr}$$

Here, $\Delta M_z$ is an estimated yaw moment value, $l_f$ and $l_r$ are distances from center of gravity of the vehicle to a front wheel shaft and a rear wheel shaft, $F_{z,i} = \{FL, FR, RL, RR\}$ denotes estimated values of force of tires in the vertical direction, $\Delta b_{\phi,Fr}$ and $\Delta b_{\phi,Rr}$ are changed values of front and rear wheel damper coefficients, $t_f$ and $t_r$ are front and rear wheel threads, b is a tire model constant, $\dot{\phi}$ is an estimated roll angular velocity, and $\alpha_{Fr}$ and $\alpha_{Rr}$ are front and rear wheel tire slip angles.

Based on Equation 1, the direction of yaw moment is changed by the roll angle and roll angular velocity of a vehicle. That is, control which is advantageous in terms of vehicle behavior may be executed by accurately estimating generated yaw moment using Equation 1. However, when Equation 1 is used, if accurate yaw motion control is required, the yaw motion may be controlled by calculating amounts of yaw moment generated according to settings of dampers, but such a method is disadvantageous in that calculation is complicated and roll angle/roll angular velocity and forces of tires in the vertical direction need to be accurately estimated.

Therefore, according to the present disclosure, based on the fact that vehicle behavior in the vertical direction influences vehicle behavior in the lateral direction, vehicle behavior in the lateral direction through dampers is controlled in consideration of a roll angular velocity as well as a roll angle so as to achieve more accurate vehicle behavior in the lateral direction and, thus, driving performance of the vehicle is further improved.

Accordingly, the present disclosure provides a method and apparatus which may improve steering ability and stability of a vehicle according to the state of the vehicle by setting damping forces of front wheel dampers and rear wheel dampers to different values in a roll motion section.

In more detail, according to the present disclosure, actual roll angle and roll angular velocity are calculated based on the state information of the vehicle and the front and rear wheel dampers are controlled according to damping force characteristics of the front and rear wheel dampers so as to reach a target yaw rate.

Figure 1:
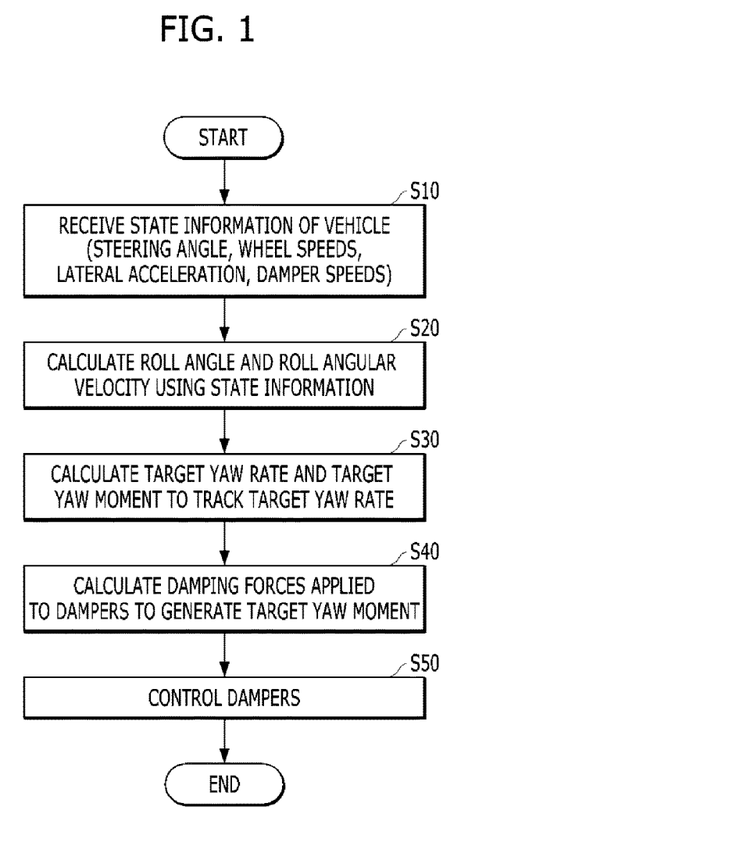
FIG. 1 is a flowchart illustrating a vehicle yaw motion control method using a suspension in accordance with one embodiment of the present disclosure.
Figure 2:
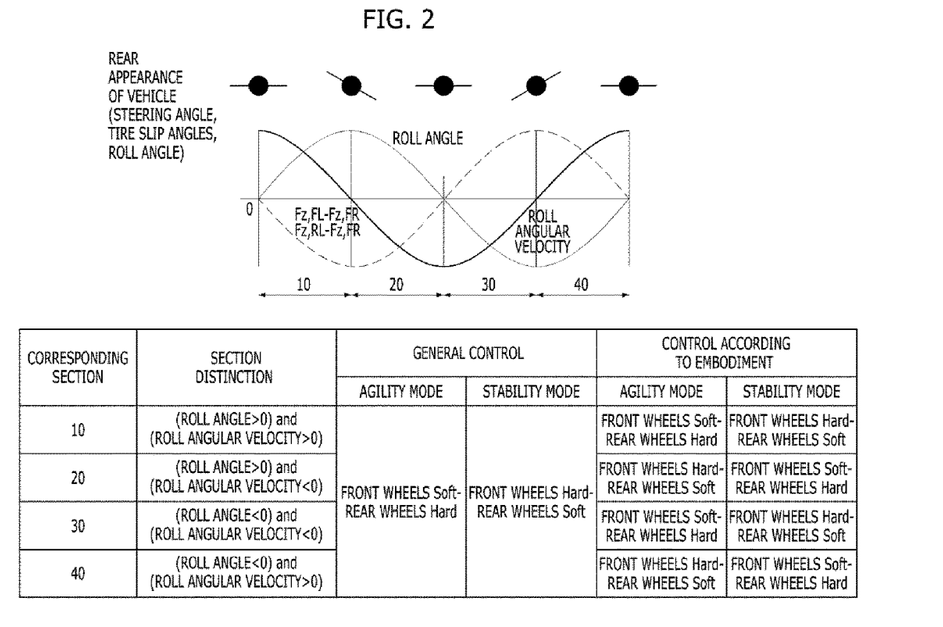
FIG. 2 is a view illustrating one example of control of dampers in a vehicle yaw motion control method using a suspension in accordance with one embodiment of the present disclosure.
Figure 3:
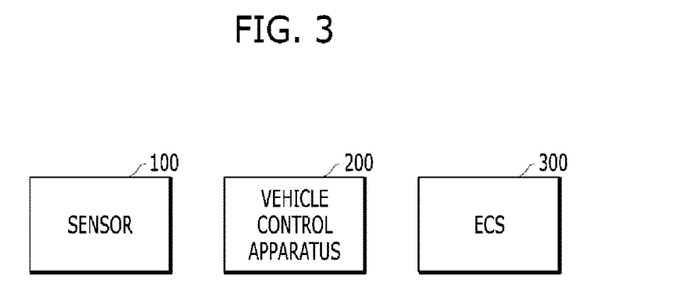
FIG. 3 is a block diagram illustrating a vehicle yaw motion control system using a suspension in accordance with one embodiment of the present disclosure.
Figure 4:
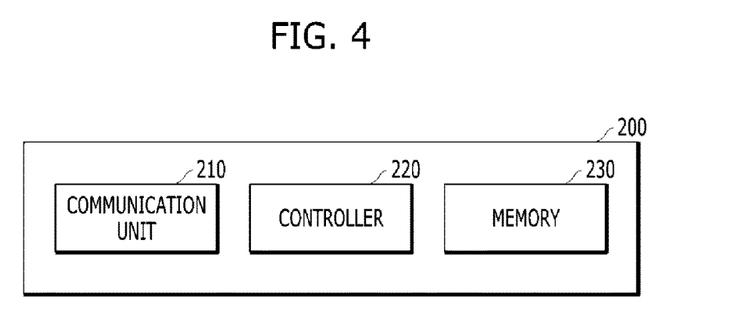
FIG. 4 is a block diagram illustrating a vehicle yaw motion control apparatus using a suspension in accordance with one embodiment of the present disclosure.

FIG. 1 sequentially illustrates a detailed method for setting damping forces of front wheel dampers and rear wheel dampers to different values, and FIG. 2 illustrates a difference between the method of the present disclosure and a conventional method through a detailed example. FIGS. 3 and 4 illustrate respective components of a vehicle yaw motion control system and apparatus in detail.

FIG. 1 is a flowchart illustrating a vehicle yaw motion control method using a suspension in accordance with one embodiment of the present disclosure.

With reference to FIG. 1, a vehicle control apparatus receives state information of a vehicle from sensors including, but not limited to, a steering angle sensor, wheel speed sensors, and a lateral acceleration sensor (Operation S10).

The state information of the vehicle may include at least one of a steering angle, wheel speeds, a lateral acceleration, and damper speeds.

The vehicle control apparatus receives the state information of the vehicle through vehicle communication with the steering angle sensor to detect a steering angle controlled by a steering wheel, the wheel speed sensors respectively mounted at front and rear wheels of the vehicle to detect speeds of the wheels, the lateral acceleration sensor to detect a lateral acceleration generated during turning of the vehicle, etc.

Vehicle communication may include controller area network (CAN) communication, local interconnect network (LIN) communication, FlexRay communication or media oriented system transport (MOST) communication, but is not limited thereto.

The vehicle control apparatus receives signal values from the steering sensor, the wheel speed sensors and the lateral direction acceleration sensor, and calculates sensor signals through analog to digital (A/D) conversion, filtering and the like.

The vehicle control apparatus calculates a roll angle and a roll angular velocity using the state information of the vehicle (Operation S20).

In accordance with one embodiment of the present disclosure, the state information of the vehicle may be a lateral acceleration of the vehicle.

The vehicle control apparatus calculates a target yaw rate and a target yaw moment to track the target yaw rate (Operation S30).

The target yaw rate and the target yaw moment are control amounts of the vehicle in the lateral direction to suppress sliding of the vehicle in the lateral direction during turning of the vehicle so as to stabilize behavior of the vehicle.

The vehicle control apparatus calculates a target yaw moment to control vehicle behavior based on the state information of the vehicle. Here, the state information of the vehicle includes a current vehicle yaw rate, a longitudinal speed, a steering angle, a yaw rate error, estimated lateral slip angles, etc.

For example, the vehicle control apparatus calculates a target yaw moment using a yaw rate error, i.e., a difference between a desired yaw rate according to driver input and a yaw rate actually measured by a sensor using a steering angle and a vehicle velocity based on a predetermined vehicle reference model. That is, the vehicle control apparatus calculates a compensation yaw moment to compensate for a difference between a yaw rate adjusted by a driver and an actually measured yaw rate.

The vehicle control apparatus calculates damping forces applied to the dampers to generate the target yaw moment (Operation S40).

The vehicle control apparatus may calculate damping forces to generate the target yaw moment based on the predetermined vehicle reference model. The vehicle control apparatus may calculate damping forces which will be applied to the respective front and rear wheel dampers based on the state information of the vehicle in consideration of dynamic relations of the vehicle.

Further, the vehicle control apparatus respectively controls a situation in which there is no obstacle in front of the vehicle (a basic mode), a situation in which, when an obstacle appears (or in a vehicle turning section), the vehicle avoids the obstacle through steering (an agility mode) and a situation in which the vehicle is controlled so as not to deviate from a course after obstacle avoidance (a stability mode).

The basic mode is set such that front wheel reference force is applied to the front wheel dampers and rear wheel reference force is applied to the rear wheel dampers in a situation in which there is no obstacle in front of the vehicle. The front wheel reference force and the rear wheel reference force may be set to different values according characteristics of the vehicle and driving habits of the driver.

The agility mode (the first mode) is set such that, in order to increase avoidance performance of the vehicle, damping force smaller than the front wheel reference force is applied to the front wheel dampers and damping force greater than the rear wheel reference force is applied to the rear wheel dampers. The rear wheel dampers may provide stability to the driver by hard characteristics of the rear wheel dampers and the front wheel dampers may improve steering ability of the driver (cause oversteer of the vehicle) by soft characteristics of the front wheel dampers.

In stability mode (the second mode) is set such that, when vehicle behavior is unstable, such as in the case of oversteer, the stability state of the vehicle is determined, damping force greater than the front wheel reference force is applied to the front wheel dampers and damping force smaller than the rear wheel reference force is applied to the rear wheel dampers.

Hard characteristics of the front wheel dampers cause understeer of the vehicle so that the vehicle does not deviate from a course.

If the state information of the vehicle satisfies performance conditions to perform the agility mode and the stability mode, the vehicle control apparatus performs the respective modes.

In addition, according to the present disclosure, when the agility mode and the stability mode are performed, a damper control strategy is changed in consideration of the roll angle and the roll angular velocity out of the state information of the vehicle.

The vehicle control apparatus maintains settings of the dampers in the agility mode and the stability mode in a situation in which a roll angle is generated, and sets damping forces applied to the respectively dampers contrary to the settings of the dampers in the agility mode and the stability mode in a situation in which the roll angle is decreased to 0.

A detailed description of these settings of the dampers will be given later with reference to FIG. 2.

The vehicle control apparatus controls the dampers in consideration of the calculated damping forces (Operation S50).

In accordance with one embodiment, in order to control the dampers based on the settings of the damping forces applied to the front wheel dampers and the rear wheel dampers, the vehicle control apparatus controls driving currents applied to the respective dampers.

FIG. 2 is a view illustrating one example of control of dampers in a vehicle yaw motion control method using a suspension in accordance with one embodiment of the present disclosure.

The driving vehicle turns according to the steering angle of the steering wheel and, when the vehicle turns, the center of gravity of the vehicle shifts from the center of rotation to the outside and thus causes leaning of the vehicle frame. Therefore, according to shifting of the center of gravity in response to change of the steering angle, a rear appearance of the vehicle, a roll angle and tire slip angles are changed.

According to the present disclosure, in a situation in which the roll angle in the positive direction or in the negative direction is generated, the agility mode and the stability mode are performed and, in a situation in which the roll angle converges upon 0, the respective modes are performed based on damping force settings contrary to the damping force settings in the agility mode and the stability mode.

With reference to FIG. 2, the vehicle control apparatus performs control according to damping force characteristics applied to the front wheel dampers and the rear wheel dampers in the agility mode and the stability mode.

In a section 10, the roll angle increases in the positive direction and, thus, the roll angle is positive and the roll angular velocity is positive. In the section 10, the vehicle control apparatus sets damping force smaller than the front wheel reference force to be applied to the front wheel dampers and sets damping force greater than the rear wheel reference force to be applied to the rear wheel dampers, in the agility mode, in the same manner as the conventional settings. Further, the vehicle control apparatus sets damping force greater than the front wheel reference force to be applied to the front wheel dampers and sets damping force smaller than the rear wheel reference force to be applied to the rear wheel dampers, in the stability mode.

In a section 20, the roll angle converges upon 0, the roll angle is positive, and the roll angular velocity is negative. In the section 20, the vehicle control apparatus controls damping forces applied to the front and rear wheel dampers contrary to the conventional settings. That is, the vehicle control apparatus sets damping force greater than the front wheel reference force to be applied to the front wheel dampers and sets damping force smaller than the rear wheel reference force to be applied to the rear wheel dampers, in the agility mode. Further, the vehicle control apparatus sets damping force smaller than the front wheel reference force to be applied to the front wheel dampers and sets damping force greater than the rear wheel reference force to be applied to the rear wheel dampers, in the stability mode.

In a section 30, the roll angle increases in the negative direction and, thus, the roll angle is negative and the roll angular velocity is negative. In the section 30, the vehicle control apparatus sets damping force smaller than the front wheel reference force to be applied to the front wheel dampers and sets damping force greater than the rear wheel reference force to be applied to the rear wheel dampers, in the agility mode, in the same manner as the conventional settings. Further, the vehicle control apparatus sets damping force greater than the front wheel reference force to be applied to the front wheel dampers and sets damping force smaller than the rear wheel reference force to be applied to the rear wheel dampers, in the stability mode.

In a section 40, the roll angle converges upon 0, the roll angle is negative, and the roll angular velocity is positive. In the section 40, the vehicle control apparatus controls damping forces applied to the front and rear wheel dampers contrary to the conventional settings. That is, the vehicle control apparatus sets damping force greater than the front wheel reference force to be applied to the front wheel dampers and sets damping force smaller than the rear wheel reference force to be applied to the rear wheel dampers, in the agility mode. Further, the vehicle control apparatus sets damping force smaller than the front wheel reference force to be applied to the front wheel dampers and sets damping force greater than the rear wheel reference force to be applied to the rear wheel dampers, in the stability mode.

When damping forces respectively applied to the front and rear wheel dampers are set, the vehicle control apparatus may set the damping forces so as to generate a target yaw moment.

FIG. 3 is a block diagram illustrating a vehicle yaw motion control system using a suspension in accordance with one embodiment of the present disclosure.

With reference to FIG. 3, the yaw motion control system may include a sensor 100, a vehicle control apparatus 200 and an electronic control suspension (ECS) 300.

The components shown in FIG. 3 are not essential and the yaw motion control system may include a larger number of components or a smaller number of components.

Hereinafter, the above-described components will be described in detail.

The sensor 100 monitors the state of a vehicle during driving of the vehicle. The sensor 100 may include a sensor to monitor the state of the vehicle, such as a steering angle sensor to detect a steering angle controlled by a steering wheel, a wheel speed sensor mounted at each of front and rear wheels of the vehicle to detect the speed of the wheel, a lateral acceleration sensor to detect a lateral acceleration of the vehicle generated when the vehicle turns, etc. However, the sensor 100 is not limited thereto but may include any device to monitor the state of the vehicle.

The sensor 100 transmits state information of the vehicle, as a result of monitoring the state of the vehicle, to the vehicle control apparatus 200.

The vehicle control apparatus 200 executes data processing and calculation to control the overall operation of the yaw motion control system.

In accordance with one embodiment, the vehicle control apparatus 200 may employ integrated chassis control (ICC) or vehicle dynamic control (VDC). The ICC or VDC is a control method to execute integrated chassis management. If a driver executes handling which may not be reactive in an emergency, the ICC or VDC controls the vehicle to suppress such handling and to stably control a handle as well as respective front and rear wheels.

In accordance with one embodiment, the vehicle control apparatus 200 may integrate a suspension (for example, an electronic control suspension (ECS)), a steering device (for example, motor-driven power steering (MDPS)), a braking device (for example, an electronic stability control (ESC)), and a drive device (for example, an AWD or a full-time four wheel drive) and thus improve driving performance of the vehicle.

The ECS 300 directly controls damping forces applied to the front and rear wheel dampers from the vehicle control apparatus 200. The ECS 300 automatically controls the height and damping force of the vehicle according to factors, such as the state of the road surface, driving conditions, selection by a driver, etc. That is, the ECS 300 automatically controls a suspension based on the state information of the vehicle and thus improves ride comfort.

In accordance with one embodiment of the present disclosure, the ECS 300 may receive a damper control signal from the vehicle control apparatus 200 and thus control the suspension.

FIG. 4 is a block diagram illustrating a vehicle yaw motion control apparatus using a suspension in accordance with one embodiment of the present disclosure.

With reference to FIG. 4, the yaw motion control apparatus 200 may include a communication unit 210, a controller 220, and a memory 230.

The components shown in FIG. 4 are not essential and the yaw motion control apparatus 200 may include a larger number of components or a smaller number of components. Hereinafter, the above-described components will be described in detail.

The communication unit 110 may transmit/receive signals and information to control damping forces applied to the front wheel dampers and the rear wheel dampers to/from the sensor 100 and the ECS 300 shown in FIG. 3.

In accordance with one embodiment, the communication unit 110 may receive state information of the vehicle from the sensor 100 and transmit a control signal regarding intensities of the damping forces applied to the front and rear wheel dampers to the ECS 300 according to activation of the agility mode and the stability mode.

The controller 120 may execute data processing and calculation to control the overall operation of the yaw motion control apparatus 200.

In accordance with one embodiment, the controller 120 calculates a roll angle and a roll angular velocity of the vehicle using the state information of the vehicle, and sets different damping forces applied to the front wheel dampers and the rear wheel dampers to execute the agility mode or the stability mode according to the signs of the roll angle and the roll angular velocity.

The memory 230 refers to a space and/or a storage to store designated program code to control the overall operation of the yaw motion control apparatus 200 and data input/output when operation by the program code is performed. The memory 230 is provided as an electrically erasable and programmable read only memory (EEPROM), a flash memory (FM), or a hard disk drive.

In accordance with one embodiment of the present disclosure, the memory 230 stores a target yaw rate and a target yaw moment, calculated based on a predetermined vehicle reference model, and stores front wheel reference force and rear wheel reference force.

The method in accordance with the above-described embodiment may be implemented as a computer executable program and stored in a computer readable recording medium. The computer readable recording medium may be one of a ROM, a RAM, a CD-ROM, a magnetic tape, a floppy disk, an optical data storage device, etc. Further, the computer readable recording medium may be realized in the form of a carrier wave (for example, transmission over the Internet).

The computer readable recording medium may be distributed to computer systems connected by a network and be stored and executed as code which is readable by computers in a distributed manner. Further, functional programs, code and code segments to implement the above-described method may be easily deduced by programmers in the art to which the embodiments pertain.

As apparent from the above description, a vehicle yaw motion control method and apparatus using a suspension in accordance with the present disclosure have effects, as follows.

First, the vehicle yaw motion control method and apparatus of the present disclosure may achieve the purposes of the present disclosure only by changing a suspension control logic without installation of any additional apparatus in a conventional vehicle and thus prevent rise in costs.

Second, the vehicle yaw motion control method and apparatus of the present disclosure may control dampers in consideration of the yaw motion and roll motion of a vehicle by the dampers and thus provide driving performance (steering ability and stability) more suitable to driving situations than a conventional damper control method.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A vehicle control method comprising steps of:
calculating a roll angle and a roll angular velocity of a vehicle using state information of the vehicle;
setting different damping forces applied to front wheel dampers and rear wheel dampers to execute a first mode and a second mode according to signs of the roll angle and the roll angular velocity; and
controlling the front wheel dampers and the rear wheel dampers in consideration of the damping forces,
wherein, upon determination that the sign of the roll angle and the sign of the roll angular velocity are different:
in the first mode, a damping force greater than a front wheel reference force is set to be applied to the front wheel dampers, and a damping force smaller than a rear wheel reference force is set to be applied to the rear wheel dampers; and
in the second mode, a damping force smaller than the front wheel reference force is set to be applied to the front wheel dampers and a damping force greater than the rear wheel reference force is set to be applied to the rear wheel dampers, and wherein, upon determination that the sign of the roll angle and the sign of the roll angular velocity are the same:

in the first mode, the damping force smaller than front wheel reference force is set to be applied to the front wheel dampers, and the damping force greater than rear wheel reference force is set to be applied to the rear wheel dampers; and in the second mode, the damping force greater than the front wheel reference force is set to be applied to the front wheel dampers and the damping force smaller than the rear wheel reference force is set to be applied to the rear wheel dampers.

2. The vehicle control method according to claim 1, wherein the step of setting the different damping forces applied to the front wheel dampers and the rear wheel dampers includes a step of:

controlling the applied damping forces so that an actual yaw rate acquired by the state information becomes equal to a predetermined target yaw rate.

3. The vehicle control method according to claim 2, wherein the step of control the applied damping forces:

calculating a target yaw moment to track the target yaw rate; and calculating damping forces to generate the target yaw moment.

4. The vehicle control method according to claim 1, wherein the state information includes at least one of a steering angle, wheel speeds, a lateral acceleration and damper speeds.

5. The vehicle control method according to claim 1, wherein the step of controlling the front wheel dampers and the rear wheel dampers in consideration of the damping forces includes:

controlling driving currents of the front wheel dampers and the rear wheel dampers.

6. A vehicle control apparatus comprising:

a communication unit configured to receive state information of a vehicle; and a controller configured to calculate a roll angle and a roll angular velocity of the vehicle using the state information and to set different damping forces applied to front wheel dampers and rear wheel dampers to execute a first mode and a second mode according to signs of the roll angle and the roll angular velocity, wherein, upon determination that the sign of the roll angle and the sign of the roll angular velocity are different:

in the first mode, the controller sets a damping force greater than a front wheel reference force to be applied to the front wheel dampers and sets a damping force smaller than a rear wheel reference force to be applied to the rear wheel dampers; and in the second mode, the controller sets a damping force smaller than the front wheel reference force to be applied to the front wheel dampers and sets a damping force greater than the rear wheel reference force to be applied to the rear wheel dampers, wherein, upon determination that the sign of the roll angle and the sign of the roll angular velocity are the same:

in the first mode, the damping force smaller than the front wheel reference force is set to be applied to the front wheel dampers, and the damping force greater than the rear wheel reference force is set to be applied to the rear wheel dampers; and in the second mode, the damping force greater than the front wheel reference force is set to be applied to the front wheel dampers and the damping force smaller than the rear wheel reference force is set to be applied to the rear wheel dampers, and wherein the controller controls the front wheel dampers and the rear wheel dampers in consideration of the damping forces.

7. The vehicle control apparatus according to claim 6, wherein the controller controls the applied damping forces so that an actual yaw rate acquired by the state information becomes equal to a predetermined target yaw rate.

8. The vehicle control apparatus according to claim 7, wherein the controller calculates a target yaw moment to track the target yaw rate and calculates damping forces to generate the target yaw moment.

9. The vehicle control apparatus according to claim 6, wherein the state information includes at least one of a steering angle, wheel speeds, a lateral acceleration and damper speeds.

10. The vehicle control apparatus according to claim 6, wherein the controller controls driving currents of the front wheel dampers and the rear wheel dampers.

11. A computer readable recording medium to record a program to execute the vehicle control method according to claim 1.

* * * * *